FIG.1

Dec. 29, 1959     F. MEYER     2,918,818
COMPENSATED CAPACITIVE GRAVIMETRIC APPARATUS
Filed Feb. 15, 1954     5 Sheets-Sheet 2

INVENTOR.
Franklin Meyer
BY Leonard H. King
AGENT.

Dec. 29, 1959        F. MEYER        2,918,818

COMPENSATED CAPACITIVE GRAVIMETRIC APPARATUS

Filed Feb. 15, 1954        5 Sheets-Sheet 3

*INVENTOR.*
Franklin Meyer

BY Leonard H. King

AGENT

Dec. 29, 1959    F. MEYER    2,918,818
COMPENSATED CAPACITIVE GRAVIMETRIC APPARATUS
Filed Feb. 15, 1954    5 Sheets-Sheet 4

FIG. 6

INVENTOR.
Franklin Meyer
BY
Leonard H. King
AGENT

Dec. 29, 1959  F. MEYER  2,918,818
COMPENSATED CAPACITIVE GRAVIMETRIC APPARATUS
Filed Feb. 15, 1954  5 Sheets-Sheet 5

FIG. 7.

INVENTOR.
Franklin Meyer

BY
Leonard H. King
AGENT

United States Patent Office 2,918,818
Patented Dec. 29, 1959

2,918,818

COMPENSATED CAPACITIVE GRAVIMETRIC APPARATUS

Franklin Meyer, Franklin Square, N.Y.

Application February 15, 1954, Serial No. 410,289

9 Claims. (Cl. 73—304)

This invention relates to capacitive type gravimetric measuring apparatus and, in particular, to such apparatus having means for compensating for the capacitive index and dielectric constant of the liquid being measured.

This application is a continuation-in-part of my co-pending application entitled "Compensated Capacitive Gravimetric Measuring Apparatus," Serial Number 381,873, filed approximately September 23, 1953.

A typical application for this apparatus is the measurement of the quantity of fuel present in fuel tanks of aircraft.

Modern aircraft, particularly jet types, can operate efficiently with a variety of fuels. In practice, these fuels have dielectric constants that differ widely, resulting in substantial errors in measurement when measured by means of conventional capacitive type measuring apparatus.

The pilot of an aircraft is concerned with the total energy available in the form of fuel in the aircraft's tank rather than specifically the total number of gallons. Since the power to be derived from any fuel is based on its available energy, which is in turn based upon weight rather than volume, it is preferred that where the system is used as a fuel gage, the indicator be calibrated in terms of pounds rather than gallons. The system described in this application determines the weight of fuel by sensing its level and applying correction factors based upon a measurement of its dielectric constant.

Recent studies have shown that different samples of the same fuel type and density may have slightly different dielectric constants due to differences in chemical structure while different samples of even the same fuel type and dielectric constant may have different densities. A capacitance type liquid level measuring device may be set to indicate very accurately, gravimetrically, for any one sample of a particular fuel at a given temperature. However, for general use wherein many different samples, even if of the same general type of fuel, are measured over a wide range of temperatures, appreciable errors can result particularly since many materials show a different ratio of change in dielectric constant with change in density. Accordingly, a practical fuel gaging system requires the ability to correct or adjust automatically for the different characteristics of a variety of different types of fuel and for changes in fuel characteristics due to temperature change.

An object of this invention is to provide a circuit for a capacitive type gravimetric measuring apparatus which automatically compensates for the dielectric constant of a liquid being measured.

A further object of this invention is to provide an improved circuit for a capacitive type gravimetric measuring apparatus which is self-compensating for changes in the capacitive index of the liquid being measured.

A particular object of this invention is the provision of an improved compensated capacitive type measuring apparatus utilizing but one reference capacitor.

A still different object is to provide a liquid measuring device which provides an indication which conforms accurately to the capacitive index of a particular liquid.

A further object of this invention is to provide an improved system for controlling a multi-phase motor.

For a more complete understanding of the present invention reference should be had to the following detailed description taken in connection with the accompanying drawings which disclose the best mode now contemplated by me for practicing the invention.

In a typical capacitive type gravimetric fuel or liquid measuring apparatus utilizing a tank unit sensing capacitor which is immersed in the fuel within a tank, if we let $\theta$ represent the indicator deflection, C the sensing capacitor capacitance for partial or complete immersion in fuel, $C_0$ the empty capacitance of the sensing capacitor and $k$ a constant of proportionality, then $$\theta = k(C - C_0) \tag{1}$$

Considering first the case of a uniform sensing capacitor, i.e. a sensing capacitor having constant capacitance per unit length, the dry capacitance is composed of two parts, that which changes when the tank is immersed in fuel, and that which does not change. The part which does not change, $C_d$, arises from such items as electrostatic lines of force which pass through solid dielectric material and is associated with the structural supports between the sensing electrodes and the lead-in wires from the electrical connectors. The other part is called the active or sensing capacitance. Letting $c$ represent the dry capacitance per unit length of capacitor and H the total sensing length, then $$C_0 = C_d + cH \tag{2}$$

If the tank unit is immersed to a depth $h$ in fuel of dielectric constant K, the capacitance is $$C = C_d + Kch + c(H-h) \tag{3}$$

The increase over the dry capacitance is $$C - C_0 = (K-1)ch \tag{4}$$

The gage response to height of fuel or liquid level is obtained by combining Equations 1 and 4.

$$\theta = kc(K-1)h \tag{5}$$

To obtain the gage response to the mass of fuel, let it be assumed the tank has a uniform cross sectional area A. If D represents the density of the fuel, the mass of fuel up to the height $h$ is $$m = hAD \tag{6}$$

Therefore, the gage response to mass is $$\theta = \left(\frac{kc}{A}\right)\left(\frac{K-1}{D}\right) m \qquad (7)$$

It will be noted that the indication depends not only upon the mass of fuel but also upon the quantity $(K-1)/D$. This very important characteristic is called the capacity index. Whenever the capacity index of the fuel in the tank differs from the capacity index to which the gage is calibrated, an error exists. This disadvantage of the uncompensated gage is avoided by the compensated gage of this invention which is independent of the dielectric constant.

Figure 1:
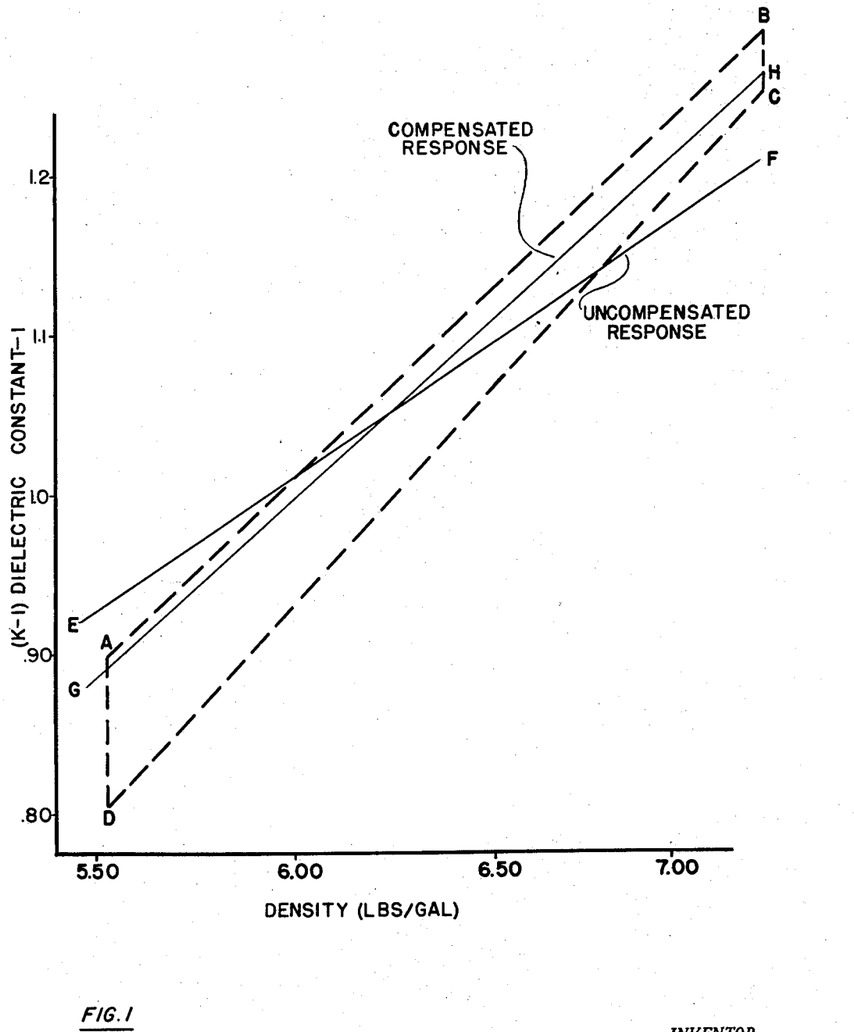
Figure 1 represents graphically the relationship between dielectric constant and density of typical aircraft fuels.

It has been pointed out that there exists a different ratio of change of dielectric constant with change in density for different liquids. However, tests of a large number of samples of fuel widely used in aircraft show that over 96% of the values for dielectric constant, over a realistic range of densities, fall within a relatively small area of the plot of $(K-1)$ vs. density curve as shown by the dashed line rectangle of Figure 1, where K is the dielectric constant. This is true even over the temperature range of minus 55° C. to plus 70° C. frequently encountered by aircraft. Accordingly, it is desired that the apparatus have a response passing through this envelope. Line EF represents the response of an uncompensated measuring apparatus while line GH represents the response of the apparatus of this invention compensated as hereinafter disclosed.

Figure 2:
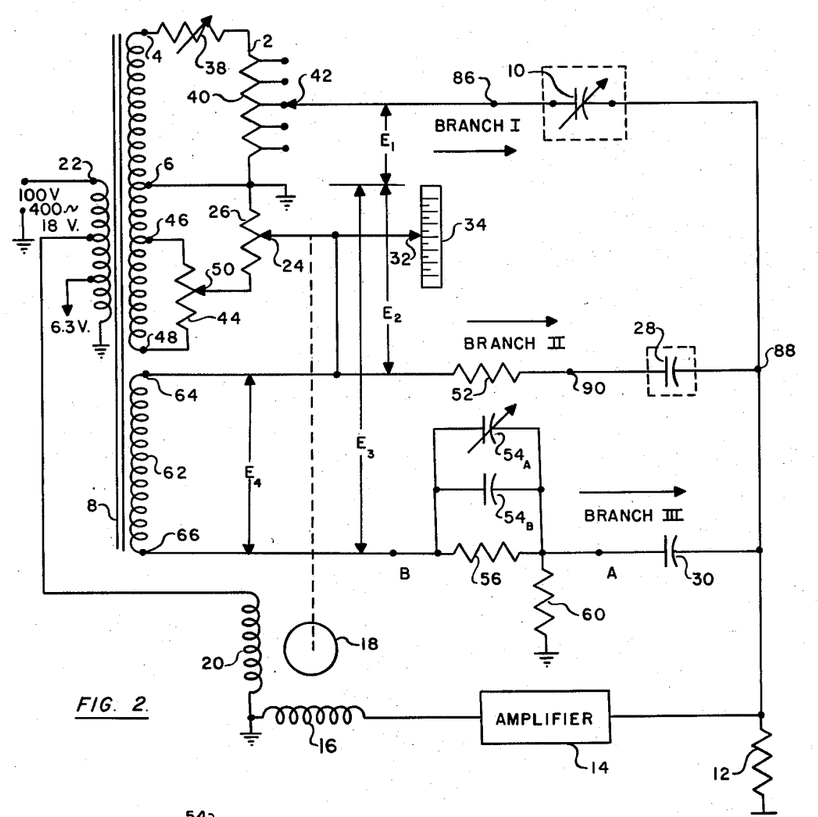
Figure 2 shows schematically the apparatus of this invention.

The apparatus includes a self-balancing circuit which consists of Branch I having a 400 cycle voltage $E_1$ provided by a voltage divider 2, which is described in greater detail later, connected between taps 4 and 6 of the secondary winding of transformer 8, and a sensing capacitor 10 adapted to be inserted in the liquid to be measured so that a change in level of the liquid results in a change in the capacitance of capacitor 10. The capacitance will change because the dielectric of the unimmersed or dry portion of capacitor 10 is air which has a dielectric constant of 1.0, while the dielectric of the immersed portion is the fuel, and the dielectric of a typical hydrocarbon fuel is in the vicinity of 2.0.

Accordingly, the capacitance of a sensing capacitor, fully immersed in fuel, would be twice as great as the capacitance of one immersed in an empty tank when the dielectric is air. A partly filled tank would result in an intermediate value of capacitance. The change in capacitance results in a change in current through the sensing capacitor and so unbalances the circuit.

Briefly stated, in order for a balanced condition of the circuit to exist it is necessary that the effect of the Branch I current on the balance sensing amplifier be cancelled. This is accomplished by providing an opposing current of equal magnitude and 180° out of phase with the Branch I current.

Since the dielectric constant of the sensing capacitor varies from 1 and not zero, when air is the dielectric, to approximately 2 when a hydrocarbon fuel fills the tank, it may be appreciated that even when an "empty" condition of the fuel tank occurs there exists a minimum current. To balance out this minimum current a fixed bucking current need be provided. The current is provided by the application of a fixed voltage to a fixed reference capacitor 30.

As the liquid level increases, the capacitance increases resulting in a greater Branch I current. To provide an offsetting current, a voltage variable with liquid level is applied to a fixed reference capacitor. A feature of this invention is the use of one reference capacitor to provide the fixed current and as well as a current variable with the level of the liquid. This is accomplished by the use of a floating or separate transformer winding 62 in series with a variable voltage source to provide a voltage varying above a fixed reference point, thus permitting the use of but one precision fixed reference capacitor instead of two. The reference capacitors required for this application are necessarily of high quality and accordingly a substantial saving in cost is effected by the omission of one.

Considering Figure 2 in greater detail, it may be seen that as a result of the current unbalance, a 400 cycle signal appears across grid resistor 12 which is the input circuit of a voltage responsive means herein shown as amplifier 14. This signal is amplified and applied to a winding 16 of two-phase motor 18. The other phase winding 20 being supplied with current from the primary winding 22 of transformer 8.

It is to be noted that it is conventional to use a phase-shifting capacitor in series with the winding 20 in order to provide the proper phase difference between the two windings.

The use of a phase-shifting capacitor is undesirable from considerations of cost, space utilization, weight and power factor. With respect to power factor the use of a phase-shifting capacitor requires the aircraft generator to supply approximately 40% more current to the motor than the circuit disclosed herein. A phase shift of approximately 90° is preferred for optimum performance of a two-phase motor. In the apparatus of this invention, the phase shifting capacitor is eliminated by designing the system so that the sum of the phase shift in the amplifier and bridge circuit provides the required phase shift.

The phase shift obtained from the bridge circuit is fixed by the values of its components. However, the amplifier may be designed to provide a phase shift which in combination with the phase shift in the bridge circuit will yield the required total phase shift.

The principles underlying the design of an amplifier to provide a phase shift of 90° minus the bridge circuit phase shift are well known. The subject of phase shift is discussed for example in Applied Electronics by members of the staff of the Department of Electrical Engineering of the Massachusetts Institute of Technology and published by the Technology Press and John Wiley and Sons, Inc., eleventh printing, December 1947. In particular, reference is made to chapter IX.

In the unbalanced condition, the signal causes the motor to operate potentiometer wiper arm 24 of a potentiometer 26 which is coupled to the shaft of motor 18. This change causes a readjustment of the voltage applied to Branches II and III. Branch II contains a capacitor 28 formed of two spaced electrodes normally immersed in the liquid to be measured so that its capacitance is a function of the dielectric constant of the liquid. The current supplied by Branch II is therefore strictly a function of the applied voltage and the capacitance of the compensating capacitor. If the liquid under measurement has a high dielectric constant then the current in Branch I will be correspondingly higher than if a low dielectric constant liquid is present. Since the same liquid forms the dielectric for the compensating capacitor it may be appreciated that the current in Branch II will also be relatively higher and thus serve to compensate for the higher dielectric material.

Branch III contains a reference capacitor 30. The currents of Branches II and III are out of phase with that of Branch I in the grid resistor 12 which forms the common portion of the three branches.

In practice it is desired that the currents of Branches II and III be precisely in phase and that of Branch I exactly 180° out of phase. A phase correcting means, forming part of the circuit, is discussed hereafter. The motor continues its operation until the circuit is balanced and no signal is applied to the amplifier. Operating in tandem with the wiper arm 24 is a pointer 32 which indicates on calibrated dial 34 the liquid level at the rest or balanced condition of the wiper.

In greater detail, Branch I contains a voltage divider connected between taps 4 and 6 of transformer 8. In one embodiment, this voltage divider consists of a 10,000 ohm variable resistor 38, which is used for fine adjustment in calibrating the system for "empty" condition, and ten fixed resistances 40 connected in series to provide an additional 10,000 ohms of resistance in logarithmic steps. Taps to the juncture of the individual resistors 40 are connected to variable switching means 42 to provide a coarse range adjustment means.

An alternative method of providing a voltage selective circuit would be to substitute a transformer having a tapped secondary winding in conjunction with a tap selecting means for the above described voltage divider arrangement.

In this apparatus, the voltage $E_2$ applied to Branch II containing the compensating capacitor 28 is directly proportional to the quantity of liquid present, since the position of potentiometer wiper 24 is a function of quantity.

This is in accordance with the principle that the amount of compensating to be applied must be proportional to the quantity of liquid present.

The voltage applied to Branch II also is affected by potentiometer 44 which is connected across a portion of the secondary winding between taps 46 and 48 which serves as an adjustment for calibrating the apparatus for "full" tank conditions. Rebalancing potentiometer 26 is connected between the wiper arm 50 of potentiometer 44 and tap 6, which is grounded. 12,000 ohm resistor 52 serves as a current-limiting and phase-shifting resistor for correction of dissipation factor.

A phase-shifting network is provided in Branch III consisting of 510,000 ohm resistor 56 shunted by capacitors 54a and 54b, and 20,000 ohm resistor 60. Resistors 56 and 60 serving additionally as a voltage divider network so as to provide a simple and inexpensive means of adjusting the circuit to the proper operating voltage.

Figure 3:
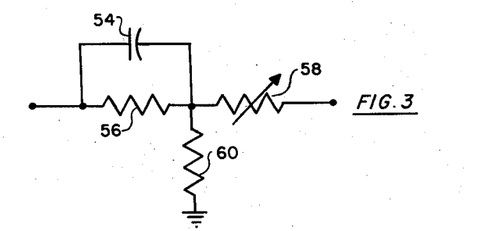
Figure 3 shows schematically an alternate phasing circuit for use with the apparatus of this invention.

An alternative phase shifting network is shown in Figure 3 which may be substituted for the circuit in Figure 2 between points A and B. This circuit provides a 68 mmf. capacitor 54, 500,000 ohm resistor 56, 10,000 ohm, rheostat 58 and resistor 60. This circuit may be adjusted by varying the rheostat 58.

In order to provide a standard unit capable of satisfactory operation with sensing capacitors of a wide range of capacities, it is necessary that the capacity of the reference capacitor be fairly large, a 1500 mmf. being generally satisfactory. The use of so large a reference capacitor minimizes the shunting effect of the sensing capacitor.

Choice of the magnitude for voltage $E_2$ is governed primarily by the value of compensating capacitor 28. Since the same voltage is also applied to Branch III, it may be appreciated that the current through reference capacitor may be greater than desired. Accordingly, the voltage divider comprising resistors 56 and 60 serve to reduce the current through the reference capacitor to a proper operational level. An additional winding 62 of transformer 8 is used to provide a fixed increment of voltage $E_4$ between taps 64 and 66 for Branch III. Thus, the voltage $E_3$ applied to Branch III is the sum of voltage $E_2$ and the voltage $E_4$ across secondary winding 62. Satisfactory operation has been maintained with the voltage across the primary of transformer 8 at 115 volts at 400 cycles, the voltage between taps 4 and 6 at 138 volts, the voltage between 6 and 46 at 21.6 volts, and the voltage between 46 and 48 at 16.1 volts, and the voltage between taps 64 and 66 at 47.2 volts.

Figure 4:
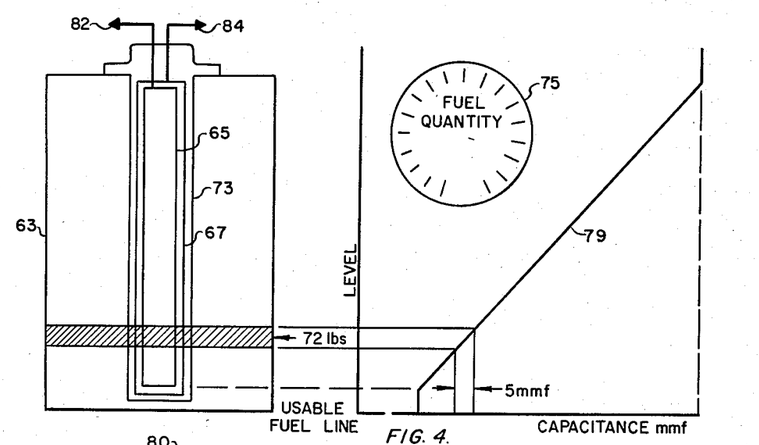
Figure 4 shows diagrammatically and graphically the relationship between the volume of a uniform tank and the running capacitance of the sensing capacitor for linear dial indication.

In describing the operation of the capacitor type liquid measuring apparatus, reference has been made so far to the ideal tank (i.e. one with a constant horizontal cross section). In Figure 4 there is shown diagrammatically a sensing capacitor mounted in such a uniform tank 63. Electrodes 65 and 67 which form the capacitor are supported by housing 73. Let it be assumed that this capacitor has a running capacitance of five mmf./inch, a one inch or five mmf. longitudinal section of the sensing capacitor would represent the same amount of fuel regardless of where the section was taken along the longitudinal extent of said capacitor. In this case, the relationship between capacitance and fuel quantity is perfectly linear throughout the usable fuel range as shown by the straight graph line 79. Since the capacitance per gallon (or pound) of fuel is the same throughout the entire length of the sensing capacitor, and since the indicator pointer moves with the potentiometer as the latter responds to changes in sensing unit capacitance, the dial will be linear, i.e. even graduated, as shown by dial 75.

Figure 5:
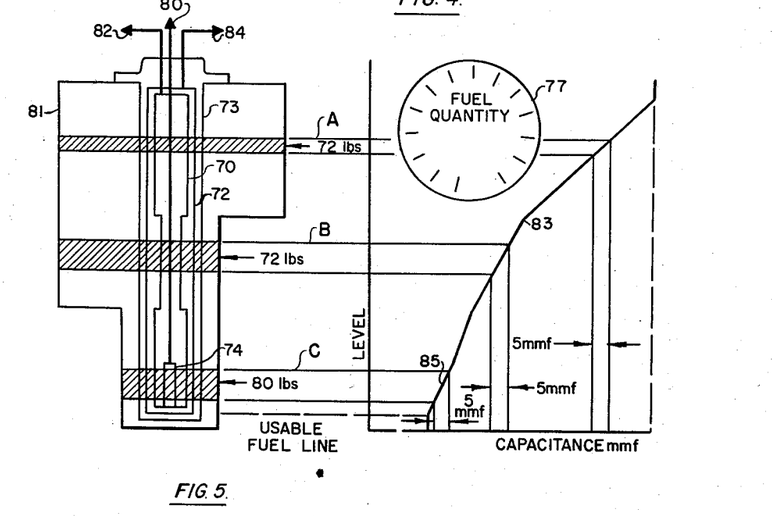
Figure 5 shows diagrammatically and graphically the relationship between the volume of a non-uniform tank and the running capacitance of the sensing capacitor for linear dial indication.

If the sensing capacitor shown in Figure 4, which has a uniform running capacitance, were installed in an odd shaped tank 81 as in Figure 5, a one inch or five mmf. section would represent many different volumes, depending upon where along the longitudinal extent of the capacitor the section was taken. Therefore, a potentiometer response to five mmf. variation in the capacity of the sensing capacitor, in this case say about 15° of dial length, would equal 20 pounds if the inch section was at the bottom of the tank. The same 15° of dial length would equal 72 pounds due to a 5 mmf. change in the capacity of the sensing capacitor resulting from a section thereof at the top of the tank, thus resulting in an unevenly graduated dial.

In order to obtain an apparatus having a dial 77 provided with uniform divisions, there is employed, in irregularly shaped tanks such as tank 81, a "profiled" sensing capacitor. A profiled sensing capacitor is one whose running capacitance varies in accordance with the cross-sectional area of the tank. As the level of the liquid in the tank changes the capacitance of the unit changes proportionally to the change in unit volume (unit level multiplied by cross-sectional area). The profiled sensing capacitor permits use of a uniformly divided dial. The effect of varying the running capacitance in a non-linear manner is shown graphically by line 83 in Figure 5 wherein a change in quantity of 72 pounds at level A produce the 5 mmf. change in capacitance as does the same change in quantity at level B.

Figure 6:
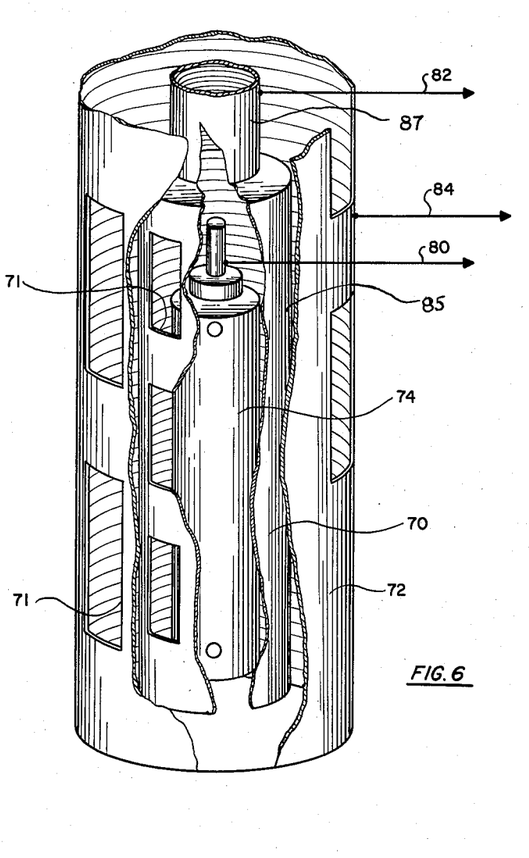
Figure 6 shows pictorially a portion of a sensing capacitor suitable for use in conjunction with the apparatus of this invention.

In order to illustrate the principle of profiling, there is shown in Figure 6 a portion of the electrodes of a typical sensing capacitor. Tubular electrode 70 of the elongated probe or tank unit illustrated in Figure 6 serves as a common electrode for both sensing capacitor 10 (in combination with electrode 72) and compensating capacitor 28 (together with electrode 74). Conductors 80, 82 and 84 connect the electrodes to the circuit at the respective points 86, 88 and 90 shown in Figure 2. This capacitor is also shown in greater detail in Figure 7. The inner tube 70 is stepped so as to provide a number of successive cylinders 85, 87, 89 and 91 of differing diameter. This serves to vary the distance between electrodes as well as the surface area of the electrode. The amount and extent of the "stepping" is determined by the actual variations in the shape of the tank, so that the same section taken along the longitudinal extent of the sensing capacitor will provide the same variation in capacitance for the same quantity of fuel regardless of where the section is taken. In addition to effecting changes in capacitance by stepping tube diameters, further variations are made by punching hole patterns 71 in the electrodes 70 and 72. By combining the stepping and punching operations the quantity vs. capacitance curve 83 may be matched with an accuracy of one half of one percent. The desirable result of profiling is evidenced by linear dial 77.

The required cylinder sizes and spacing may be determined by the designer by simple substitution in well known equations. For example, in the Radio Engineers' Handbook by F. E. Terman, published by the McGraw-Hill Book Company, New York, first edition, on page 118 the following formula is given for the capacity of a pair of concentric electrodes:

$$C = \frac{7.354K}{\log_{10} \frac{D}{d}} \text{ mmf, per foot}$$

where $D$=inside diameter of the outside cylinder
$d$=outside diameter of the inner cylinder
$k$=dielectric constant of material between cylinders The punching operation reduces the value of capacitance in accordance to the amount of the area of the electrode removed.

This method of profiling has been used successfully on hundreds of tank shapes ranging from symmetrical drums used in airships to the odd configurations used on jet fighters.

Provision is made for compensating for the exposure of the compensating capacitor to air when the liquid level drops to an unusually low point, although such condition might rarely occur. This exposure compensating system is disclosed in the copending application of Leo A. Weiss for "Capacitive Liquid Measuring Apparatus," Serial Number 385,487, filed approximately October 12, 1953, and assigned to the assignee of the present invention. The exposure compensating is accomplished by "over-profiling" the sensing capacitor in the region of the compensating capacitor.

A profiled sensing capacitor has been defined as one whose running capacitance varies in accordance with the cross-sectional area of the tank. By over-profiling is meant the variation of the running capacitance in a non-linear fashion with respect to variations in the cross-sectional area of the tank, but in accordance with a predetermined pattern as hereinafter described.

The deviation shown in Figure 5 for the lowermost portion of the tank wherein an 80 pound quantity at level C produces a change of capacitance equal to the same change produced at level B by a smaller quantity. is the result of over-profiling of the lower portion of the sensing capacitor to compensate for changes in system response when the liquid level drops to a point at which electrode 74 of the compensating capacitor 28 is partially exposed to air.

The method of calculating the required interelectrode capacitance and accordingly the electrode area of the portion of the sensing capacitor coextensive with the compensating capacitor requires consideration of the overall system response.

It has been pointed out above that the bridge circuit shown in Figure 3 is balanced when the current in Branch I is equal and opposite to the sum of the currents in Branches II and III. Expressed algebraically, $$C_{10}E_1 = C_{28} + \alpha E_3 C_{30}$$

where $C_{10}$=the capacitance of sensing capacitor 10
$C_{28}$=the capacitance of compensating capacitor 28
$C_{30}$=the capacitance of reference capacitor 30
$E_1$=the fixed voltage applied to the sensing capacitor 10
$E_2$=the voltage that varies in accordance with the variation in liquid level
$E_3$=the sum of the fixed increment of voltage across floating winding 62 plus voltage $E_2$
$\alpha$=the ratio of the effective portion of voltage $E_3$ applied to capacitor 30 to the total $E_3$ voltage Under conditions of bridge balance the voltage divider comprising resistors 56 and 60 maintain the voltage at point A at a fixed level relative to voltage $E_3$. Accordingly, the voltage applied to capacitor 30 is $\alpha E_3$ where, $$\alpha = \frac{R_{60}}{R_{56} + R_{60}}$$

where $R_{56}$=the resistance of resistor 56 in ohms
$R_{60}$=the resistance of resistor 60 in ohms Solving equation $C_{10}E_1 = C_{28}E_2 + \alpha E_3 C_{30}$ for $C_{10}$, $$C_{10} = \frac{C_{28}E_2 + \alpha E_{30} C_3}{E_{10}}$$

The values to be substituted are all calculable, $E_1$ and $C_3$ are constants under all conditions of liquid level, and by making $E_2$ and $E_3$ vary linearly in accordance with the quantity of liquid present in the tank the proper running capacitance for each point of the sensing capacitor may be determined.

A number of levels are assumed and the equation is solved for the value of $C_1$ at each of these levels. The electrode spacing and/or area may be designed to provide the required capacitance $C_1$ at each of said levels using the equation for coaxial capacitors given above.

The resulting over-profiled sensing capacitor is shown in Figure 6 wherein electrodes 70 and 72 have been punched to provide openings 71 as a means of varying the interelectrode capacitance. If the sensing capacitor were simply profiled in accordance with the variation in cross-sectional area of the tank, then the area punched out would be smaller. As has been pointed out previously, an additional variation in interelectrode capacitance may be obtained by stepping or varying the diameter of electrode 70 in the region opposite the compensating capacitor 74.

It may be seen from Figure 5 the result of the over-profiling will be a non-linear volume vs. capacitance relationship for the portion 85 of curve 83 although the overall system response is now linear with change in quantity.

Figure 7:
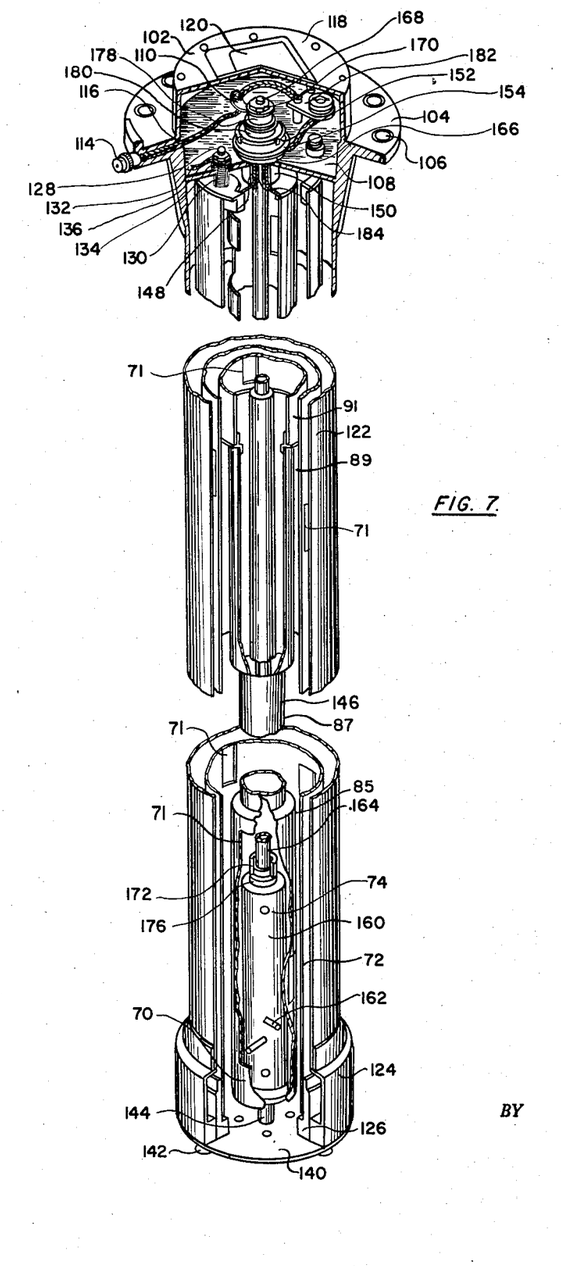
Figure 7 shows in partial section a capacitor employed in the practice of this invention.

In Figure 7 there is disclosed a typical sensing capacitor adapted for use with the apparatus of this invention. The sensing capacitor is inserted through an opening in a tank as shown in outline in Figure 5. An aluminum head casting 102 having a flange portion 104 is bolted to the tank by means of bolts passed through holes 106. Head casting 102 serves as the primary supporting element for the sensing capacitor. Bulkhead 108, an integral portion of the casting, serves to seal the portion of the sensing capacitor inside the tank from the outside atmosphere. Vapor tight terminals pass through the bulkhead and are insulated therefrom by insulators as described hereinafter. Connectors 114, only one of which is shown in the cutaway view, permit coupling to the remotely located bridge circuit through appropriate conductors. A cover plate 118 provides access to the terminals. A name plate 120 may be affixed to the cover plate 118.

Aluminum tube 122 serves as an electrical shield and structural support for the elongated sensing capacitor. Aluminum tube 122 is supported at one end by casting 102 and in turn at the other end it supports metal ring 124. Casting 102 and tube 122 are assembled together by shrink fitting. Ring 124 is spot welded to tube 122.

"Teflon" insulating ring 126, which fits tightly to the inside of ring 124 serves to space tubular aluminum outer electrode 72 concentrically with tube 122. "Teflon" is the trade name of E.I. du Pont de Nemours & Co., Inc., Plastics Department, for its tetrafluoroethylene resin.

The outer end of electrode 72 is supported rigidly from the bulkhead 108 by means of two terminals 110 each of which consists of a bolt 128 attached to electrode 72 and insulated from bulkhead 108 by insulator 130. Nuts 132 and washer 134 serve to secure the assembly rigidly in place and also permit the securing of a conductive lead 136, so as to complete the circuit from connector 114 (not shown) to electrode 72.

End plate 140 is attached to ring 124 by means of screws 142. Insulator 144 is affixed by a screw not shown to the center of end plate 140 and supports in concentric relationship to the other electrode, inner electrode 70. It is to be noted that this tube 70 is stepped so as to provide cylinders of differing diameters, such as, for example, reduced diameter cylinder portion 146. Insulator 144 is inserted with a sliding fit inside of inner tube 70 and does not support it at the lower end but merely positions it concentrically. At the upper end cylinder 70 is provided with a reduced portion 148 which passes through bulkhead 108 and is insulated therefrom by insulator 150. The end of portion 148 is threaded so that locking nut 152 may be tightened down onto insulator 166 so as to compress insulator 150 between the electrode 70 and the lower face of bulkhead 108. Lug 154 inserted under the tightening nut provides a convenient means for making electrical connection to electrode 70.

Compensating electrode 74 consists of a tube 160 which is spaced in concentric relation to inner tube 70 by means of a pair of insulating plastic pins 162 inserted perpendicularly to the axis of the compensating capacitor electrode 74 and at 60° to each other.

A stiff metal rod 164 serves as a support for electrode 74 and as an electrical conductor. The rod is terminated in a threaded portion 168 upon which nut 170 may be tightened to secure the rod rigidly from head casting 102 and also serve to electrically connect electrode 74 and terminal lug 110. A conductor 116 completes the circuit from terminal 110 to connector 114.

In order to eliminate capacitance effects between conductor 164 and the inner cylinder 70, along the entire length of the sensing capacitor, shield 172 formed of a thin metal tube is placed over rod 164 and insulated from the rod and compensating capacitor by means of insulators 176 and 178.

Insulators 180 and 184 space shield 172 from tube 148. Shield 172 is electrically connected to the casting 102 by means of a ground strap (not shown).

Openings 71 serve to vary the electrode area for purposes of profiling as explained earlier.

In order that production units be interchangeable it is necessary that means be provided to finally adjust the assembled unit to a standard capacitance. Openings 71 provided for purposes of profiling serve to vary the interelectrode capacitance as the inner tube 70 is rotated with respect to the other electrode 72. At the proper point the locking nut 152 is tightened to fix the relative positions.

The capacitance of the compensating capacitor 28 is fixed by adjustment of trimmer capacitor 182 located in head casting 102. This trimmer is connected between electrodes 70 and 74 by means of conductors affixed to the corresponding terminals.

As explained above, if the capacitors to be immersed in the liquid are profiled in accordance with the variations of the cross-sectional area of the tank, a change in capacitance for a given change in level will be proportional to the change in quantity rather than strictly the change in level. Accordingly, as used herein, references to changes in voltages or capacitance proportional to the change in level are intended to broadly include the special cases where a change in quantity is measured.

While I have illustrated and described what is the best mode contemplated for carrying out the invention, it is to be understood that I do not limit myself to the precise constructions herein disclosed, and the right is reserved to all changes and modifications coming within the scope of the invention as defined in the appended claims.

Having thus described my invention, what I claim as new and desire to secure by United States Letters Patent is:

1. Gravimetric measuring apparatus comprising a first circuit including a first A.-C. voltage source and a variable capacitor unit adapted to be inserted into a liquid being measured so that the capacity of the unit varies with the level of said liquid; a second circuit including a second A.-C. voltage source out of phase with said first voltage source, and a compensating capacitor having a dielectric constant substantially the same as the dielectric constant of the liquid under measurement; a third circuit including a fixed source of A.-C. voltage and a variable source of A.-C. voltage out of phase with said first voltage source, and a reference capacitor; an amplifier common to said three circuits and connected to receive the outputs, respectively, thereof, and means operable under the control of said amplifier for varying said second voltage source and the variable voltage source of said third circuit in response to differential current output of said circuits in a direction tending to reduce said differential output current substantially to zero and indicating means under control of said last-named means.

2. Gravimetric measuring apparatus comprising a first circuit including a first A.-C. voltage source and a variable capacitor unit adapted to be inserted into a liquid being measured so that the capacity of the unit varies with the level of said liquid; a second circuit including a second A.-C. voltage source out of phase with said first voltage source, and a compensating capacitor having a dielectric constant substantially the same as the dielectric constant of the liquid under measurement; a third circuit including a fixed source of A.-C. voltage and a variable source of A.-C. voltage out of phase with said first voltage source, and a reference capacitor; an amplifier common to said three circuits and connected to receive the outputs, respectively, thereof, means operable under the control of said amplifier for varying said second voltage source and the variable voltage source of said third circuit in response to output current differential of said circuits so as to reduce said output current differential substantially to zero, the output of said first circuit being substantially 180° out of phase with the outputs of said second and third circuits; and indicating means under control of said last named means.

3. An apparatus for measuring the quantity of a liquid in a container comprising an elongated capacitive probe for insertion in said container so as to be immersed in said liquid in relation to the quantity of liquid present, a voltage responsive means, a first A.-C. voltage source, a circuit including said probe, said voltage responsive means and said first voltage source; a compensating capacitor for complete immersion in said liquid; a variable second A.-C. voltage source, a second circuit including said compensating capacitor and said second voltage source being connected in series with said voltage responsive means; a reference capacitor and a third source of voltage comprising said second voltage source and a fixed A.-C. voltage source connected in series with said voltage responsive means, the currents in said circuits having a predetermined phase relation, whereby a resulting current flowing through said voltage responsive means is in phase opposition to the current of said first circuit and in phase with the current of said second circuit; and means operable under the control of said voltage responsive means for varying said second voltage source so as to reduce the total current input to said voltage responsive means substantially to zero.

4. A capacitive type liquid quantity measuring apparatus comprising in combination: a variable capacitor unit comprising a pair of electrodes adapted to be inserted into a container of liquid so that the capacity of the unit varies with the level of said liquid; a fixed comparison capacitor; a compensating capacitor utilizing said liquid as a dielectric; A.-C. voltage source for energizing said variable capacitor; an amplifier having an input circuit; a first circuit including said source of voltage, said variable capacitor and said amplifier input circuit; a second circuit including a source of A.-C. voltage proportional to the level of the liquid being measured, said fixed comparison capacitor, and said amplifier input circuit; a third circuit including a fixed source of A.-C. voltage and a variable source of A.-C. voltage, said compensating capacitor, and said amplifier input circuit; varying means controlled by said amplifier for varying said second and third circuit voltages so as to reduce the current output of said amplifier to substantially zero; indicating means under control of said varying means, said means being controlled by said amplifier; and alternating current power supply means for energizing said varying means; said first, second and third circuits voltage sources having a predetermined phase relation, whereby the current from said first circuit is essentially opposite in phase to the current from said second and third circuits.

5. A capacitive type liquid quantity measuring apparatus comprising in combination: a first source of A.-C. electrical energy; a voltage divider network connected to said first source of energy; an amplifier having an input circuit; a pair of electrodes adapted to be inserted into a container of liquid so that the interelectrode capacitance of the electrodes is a function of the level of the liquid; a first circuit comprising a portion of said voltage divider, said pair of electrodes and said input circuit; a second A.-C. energy source; a potentiometer connected to said second energy source and provided with a movable tap means; a capacitor adapted to be immersed in said liquid so that liquid serves as a dielectric for said capacitor; means connecting said capacitor, said input circuit, said variable tap means and a portion of said potentiometer so as to form a second circuit; a third A.-C. energy source; a fixed capacitor; a third circuit comprising means connecting said variable tap, said third energy source, said fixed capacitor and said input circuit, the current of the said third circuit being substantially in phase with the current of said second circuit and substantially 180° out of phase with the said first circuit current present in said input circuit; means controlled by said amplifier to vary the said movable tap, whereby to cancel out said out of phase currents in said input circuit and indicating means controlled by said last named means for indicating the quantity of liquid measured by said apparatus.

6. The apparatus of claim 6 having means to vary the portion of the voltage of the said second source of energy applied to said potentiometer, whereby to adjust said apparatus for a full quantity of liquid.

7. A capacitive type liquid quantity measuring apparatus comprising in combination: a first A.-C. source of electrical energy; a voltage divider network connected to said first source of energy; an amplifier having an input circuit; a pair of electrodes adapted to be inserted into a container of liquid so that the interelectrode capacitance of the electrodes is a function of the level of the liquid; a first circuit comprising a portion of said voltage divider, said pair of electrodes and said input circuit; a second A.-C. energy source; a resistor, a potentiometer connected to said second energy source and provided with a movable tap means; a capacitor adapted to be immersed in said liquid so that said liquid serves as a dielectric for said capacitor; means connecting said capacitor, said input circuit, said movable tap means, said resistor and a portion of said potentiometer so as to form a second circuit; a third A.-C. energy source; a fixed capacitor; a phase shifting network comprising a first resistor shunted by a capacitor in series with a second resistor, a third circuit comprising means connecting said variable tap, said phase shifting network, said third energy source, said fixed capacitor and said input circuit; the current of the said first circuit being substantially 180° out of phase with the currents of said second and said third circuits present in said input circuit, and means controlled by said amplifier to vary the said movable tap for balancing out said currents in said input circuit.

8. A capacitive type liquid quantity measuring apparatus comprising in combination: a first source of A.-C. electrical energy; a voltage divider network connected to said first source of energy; an amplifier having an input circuit; a pair of electrodes adapted to be inserted into a container of liquid so that the interelectrode capacitance of the electrodes is a function of the level of the liquid; a first circuit comprising a portion of said voltage divider, said pair of electrodes and said input circuit; a second A.-C. energy source substantially 180° out of phase with said first energy source; a potentiometer connected to said second energy source and provided with a movable tap means; a capacitor adapted to be immersed in said liquid so that said liquid serves as a dielectric for said capacitor; means connecting said capacitor, said input circuit, said movable tap means, and a portion of said potentiometer so as to form a second circuit; a third A.-C. energy source substantially in phase with said second energy source; a fixed capacitor; a phase shifting network, a third circuit comprising means connecting said variable tap, said phase shifting network, said third energy source, said fixed capacitor and said input circuit; the current of the said first circuit being substantially 180° out of phase with the currents of said second and said third circuits present in said input circuit, and means controlled by said amplifier to vary the said movable tap for balancing out said currents in said input circuit.

9. Liquid quantity responsive apparatus comprising in combination: a variable capacitor unit comprising a pair of electrodes adapted to be inserted into a liquid so that the capacitance of the unit varies with the level of said liquid; an A.-C. voltage source for energizing said variable capacitor with a voltage of one phase; an amplifier; a first circuit including said source of voltage, said variable capacitor and said amplifier; a two electrode compensating capacitor utilizing one of said pair of electrodes as one of said two electrodes and a portion of said liquid as the dielectric between said two electrodes; a second circuit including a source of A.-C. voltage opposite in phase to that of said first circuit voltage source, said compensating capacitor, and said amplifier; a third circuit including a reference capacitor, a fixed source of A.-C. voltage and a source of A.-C. voltage opposite in phase to said voltage of said first circuit, and said amplifier; and means operable under the control of said amplifier for varying said second circuit voltage and a portion of said third circuit voltage, whereby to balance the outputs of said circuits, and indicator means under control of said last named means.

References Cited in the file of this patent

UNITED STATES PATENTS

| | | |
|---|---|---|
| 1,586,233 | Anschutz | May 25, 1926 |
| 2,422,074 | Bond | June 10, 1947 |
| 2,563,280 | Schafer | Aug. 7, 1951 |
| 2,638,000 | Sontheimer | May 12, 1953 |
| 2,718,146 | Bancroft | Sept. 20, 1955 |
| 2,724,273 | Sontheimer | Nov. 22, 1955 |
| 2,738,673 | Campani | Mar. 20, 1956 |